United States Patent
Kanchu et al.

(10) Patent No.: US 12,425,671 B2
(45) Date of Patent: Sep. 23, 2025

(54) AUTOPLAYING CONTENT ACROSS MULTIPLE PROVIDERS ON A TELEVISION

(71) Applicant: GOOGLE LLC, Mountain View, CA (US)

(72) Inventors: Venkata Gangadhar Kanchu, Bangalore (IN); Sundaramoorthy Murugesan, Bangalore (IN); Tamojit Chatterjee, Shyamnagar (IN); Kopal Niranjan, Lucknow (IN); Shravan Nayak, Bangalore (IN); Priyanshi Sharma, Greater Noida (IN); Kanishka Mishra, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 44 days.

(21) Appl. No.: 18/584,902

(22) Filed: Feb. 22, 2024

(65) Prior Publication Data
US 2025/0274625 A1    Aug. 28, 2025

(51) Int. Cl.
*H04N 21/262* (2011.01)
*H04N 21/25* (2011.01)
*H04N 21/44* (2011.01)

(52) U.S. Cl.
CPC ..... *H04N 21/26258* (2013.01); *H04N 21/251* (2013.01); *H04N 21/44* (2013.01)

(58) Field of Classification Search
None
See application file for complete search history.

(56) References Cited

U.S. PATENT DOCUMENTS

| | | | |
|---|---|---|---|
| 9,502,017 B1* | 11/2016 | Becherer | G10H 1/0025 |
| 2013/0080371 A1 | 3/2013 | Harber et al. | |
| 2017/0055039 A1 | 2/2017 | Earle | |
| 2019/0335228 A1 | 10/2019 | Sprenger et al. | |
| 2020/0382838 A1* | 12/2020 | Sen | H04N 21/41407 |
| 2021/0174835 A1* | 6/2021 | Sen | H04N 21/8113 |
| 2023/0051449 A1 | 2/2023 | Froy et al. | |

OTHER PUBLICATIONS

Lukoff, et al., "How the Design of Youtube Influences User Sense of Agency", https://dl.acm.org/doi/10.1145/3411764.3445467, May 7, 2021.

* cited by examiner

*Primary Examiner* — James R Marandi
(74) *Attorney, Agent, or Firm* — Brake Hughes Bellermann LLP

(57) ABSTRACT

According to an aspect, a method may include receiving a request to generate an autoplay list, identifying a plurality of media content items, identifying a runtime for each of the plurality of media content items, based on determining that a runtime for a media content item included in the plurality of media content items exceeds a predefined runtime, generating a clip of the media content item with a runtime that is less than or equal to the predefined runtime, generating an ordered list of the plurality of media content items, substituting the clip for the media content item in place of the media content item included in the ordered list, generating an autoplay list based on the ordered list, and sending the autoplay list for a television application to play the plurality of media content items in the autoplay list on a network-connected display device.

20 Claims, 5 Drawing Sheets

AUTOPLAYING CONTENT ACROSS MULTIPLE PROVIDERS ON A TELEVISION

BACKGROUND

A television (TV) application may present various types of media content of interest to a user. The media content may have different formats such as streaming video and audio. The types of media content may include, but are not limited to, movies, television shows, sporting events, news items, short form videos, and music. In addition, or in the alternative, a variety of media content providers may deliver various types of media content for viewing by the user. The TV application may deliver a customized viewing experience to a user that spans the diverse types of media content provided by the variety of media content providers.

SUMMARY

In some non-limiting examples, a user may autoplay media content on a television. The user may be presented with media content items that are selected and customized for the user based on preferences of the user and past viewing behaviors and habits of the user. The user may play and watch the media content without having to interact with a remote control or other device to select and advance the playing of the media content items. The user may autoplay a variety of types of media content that may include but are not limited to short form videos, movie clips, live television shows, live television news, live television sports, on demand video content, and television show episodes. Different media content providers may provide or stream the media content items to the television. In some implementations, the television may be a smart television that executes a television (TV) application. The TV application may interface with the media content providers to continuously stream recommended media content items to the television for autoplaying to the user.

In some aspects, the techniques described herein relate to a method including: receiving, by a server computer and from a network-connected display device, a request to generate an autoplay list; and in response to receiving the request: identifying a plurality of media content items; identifying a runtime for each of the plurality of media content items; determining that a runtime for a media content item included in the plurality of media content items exceeds a predefined runtime; based on determining that the runtime for the media content item exceeds the predefined runtime, generating a clip of the media content item, the runtime of the clip being less than or equal to the predefined runtime; generating an ordered list of the plurality of media content items; substituting the clip for the media content item in place of the media content item included in the ordered list; generating the autoplay list based on the ordered list of the plurality of media content items; and sending, by the server computer and to the network-connected display device, the autoplay list for a television application, executing on the network-connected display device, to play the plurality of media content items in the autoplay list on the network-connected display device.

In some aspects, the techniques described herein relate to a method, wherein the network-connected display device is a smart television.

In some aspects, the techniques described herein relate to a method, wherein generating the clip of the media content item includes creating a modified watch action for the media content item that includes a start time and an end time for the clip.

In some aspects, the techniques described herein relate to a method, wherein substituting the clip for the media content item in place of the media content item includes serving the modified watch action in place of the media content item.

In some aspects, the techniques described herein relate to a method, wherein generating the clip of the media content item includes generating a first clip including: identifying a start time and an end time for a first scene included in the media content item; and creating a first modified watch action for the media content item that includes the start time and the end time for the first scene.

In some aspects, the techniques described herein relate to a method, wherein generating the clip of the media content item further includes generating a second clip including: identifying a start time and an end time for a second scene included in the media content item; and creating a second modified watch action for the media content item that includes the start time and the end time for the second scene.

In some aspects, the techniques described herein relate to a method, wherein substituting the clip for the media content item in place of the media content item includes substituting the first clip for the media content item and the second clip for the media content item in place of the media content item by serving the first modified watch action and the second modified watch action in place of the media content item.

In some aspects, the techniques described herein relate to a method, wherein identifying a plurality of media content items includes identifying a plurality of media content providers that provide media content to a user of the television application.

In some aspects, the techniques described herein relate to a method, wherein identifying a plurality of media content items includes determining preferences of a user for types of media content.

In some aspects, the techniques described herein relate to a method, wherein creating an ordered list of the plurality of media content items includes ordering the plurality of media content items in the ordered list based on the preferences of the user.

In some aspects, the techniques described herein relate to a non-transitory computer-readable medium storing executable instructions that when executed by at least one processor of a server computer cause the at least one processor to execute operations, the operations including: receiving, by the server computer and from a network-connected display device, a request to generate an autoplay list; and in response to receiving the request: identifying a plurality of media content items; identifying a runtime for each of the plurality of media content items; determining that a runtime for a media content item included in the plurality of media content items exceeds a predefined runtime; based on determining that the runtime for the media content item exceeds the predefined runtime, generating a clip of the media content item, the runtime of the clip being less than or equal to the predefined runtime; generating an ordered list of the plurality of media content items; substituting the clip for the media content item in place of the media content item included in the ordered list; generating the autoplay list based on the ordered list of the plurality of media content items; and sending, by the server computer and to the network-connected display device, the autoplay list for a television application, executing on the network-connected display device, to play the plurality of media content items in the autoplay list on the network-connected display device.

In some aspects, the techniques described herein relate to a non-transitory computer-readable medium, wherein the network-connected display device is a smart television.

In some aspects, the techniques described herein relate to a non-transitory computer-readable medium, wherein generating the clip of the media content item includes creating a modified watch action for the media content item that includes a start time and an end time for the clip.

In some aspects, the techniques described herein relate to a non-transitory computer-readable medium, wherein substituting the clip for the media content item in place of the media content item includes serving the modified watch action in place of the media content item.

In some aspects, the techniques described herein relate to a non-transitory computer-readable medium, wherein generating the clip of the media content item includes generating a first clip including: identifying a start time and an end time for a first scene included in the media content item; and creating a first modified watch action for the media content item that includes the start time and the end time for the first scene.

In some aspects, the techniques described herein relate to a non-transitory computer-readable medium, wherein generating the clip of the media content item further includes generating a second clip including: identifying a start time and an end time for a second scene included in the media content item; and creating a second modified watch action for the media content item that includes the start time and the end time for the second scene.

In some aspects, the techniques described herein relate to a non-transitory computer-readable medium, wherein substituting the clip for the media content item in place of the media content item includes substituting the first clip for the media content item and the second clip for the media content item in place of the media content item by serving the first modified watch action and the second modified watch action in place of the media content item.

In some aspects, the techniques described herein relate to a system including: at least one processor; and a non-transitory computer-readable medium storing instructions that when executed by the at least one processor cause the system to: receive a request to generate an autoplay list; and in response to receiving the request: identify a plurality of media content items; identify a runtime for each of the plurality of media content items; determine that a runtime for a media content item included in the plurality of media content items exceeds a predefined runtime; based on determining that the runtime for the media content item exceeds the predefined runtime, generate a clip of the media content item, the runtime of the clip being less than or equal to the predefined runtime; generate an ordered list of the plurality of media content items; substitute the clip for the media content item in place of the media content item included in the ordered list; generate the autoplay list based on the ordered list of the plurality of media content items; and send, to a network-connected display device, the autoplay list for a television application, executing on the network-connected display device, to play the plurality of media content items in the autoplay list on the network-connected display device.

In some aspects, the techniques described herein relate to a system, wherein the network-connected display device is a smart television.

In some aspects, the techniques described herein relate to a system, wherein generating the clip of the media content item includes creating a modified watch action for the media content item that includes a start time and an end time for the clip; and wherein substituting the clip for the media content item in place of the media content item includes serving the modified watch action in place of the media content item.

The details of one or more implementations are set forth in the accompanying drawings and the description below. Other features will be apparent from the description and drawings, and from the claims.

DETAILED DESCRIPTION

Figure 1A:
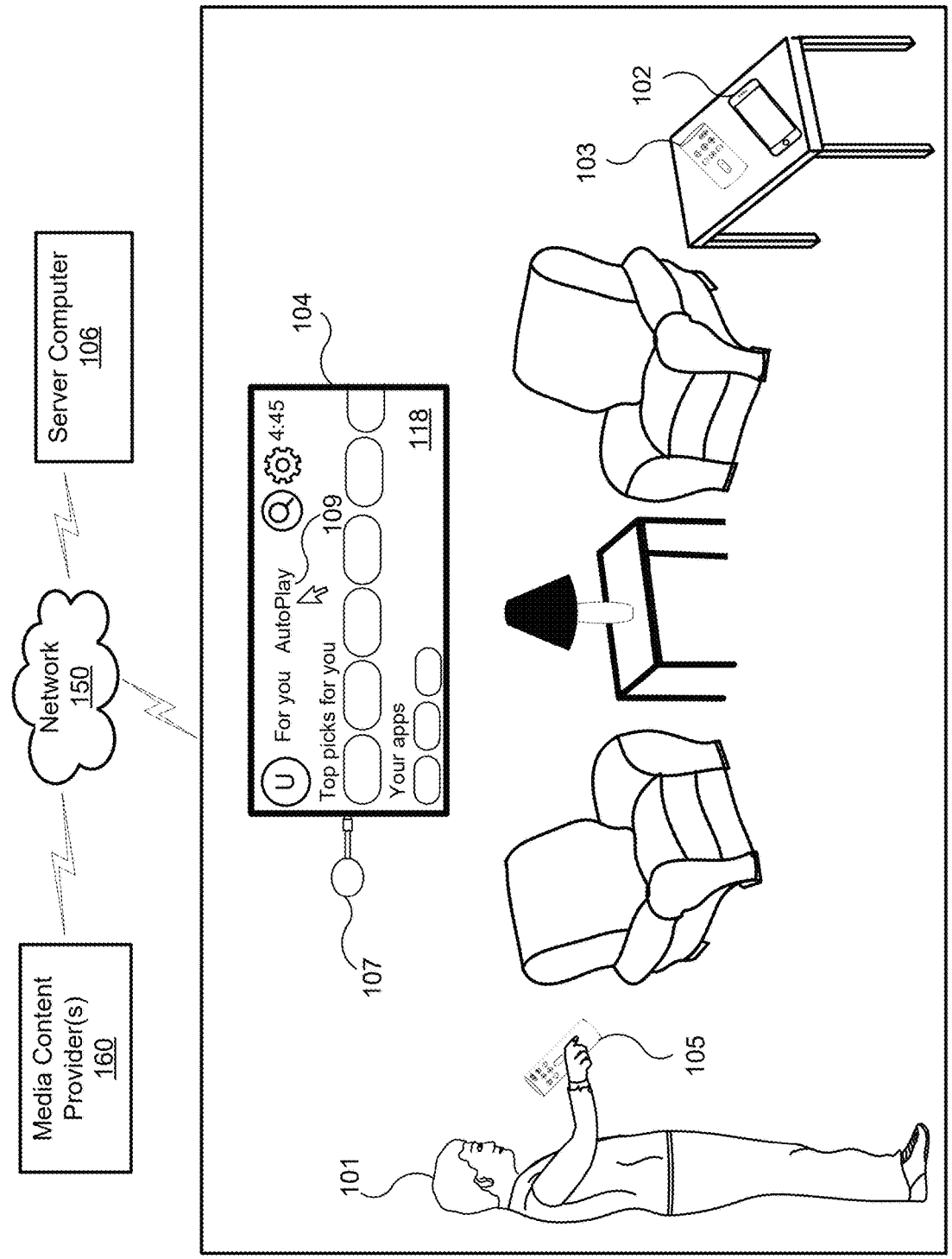
FIG. 1A illustrates an example of a user interacting with a network-connected display device and a media adapter, according to implementations described throughout this disclosure.

The disclosure generally relates to systems and methods for autoplaying media content items on a television. In some implementations, a user may indicate that they would like a television application to autoplay media content of various different types and from a variety of different media content providers on a television. The user may want to watch a sequential and uninterrupted stream of media content items on the television. The user may prefer not to select or otherwise choose the media content items for autoplaying, allowing the TV application to facilitate the selection of the media content of interest to the user. The TV application may provide recommended media content items for viewing by the user based on user preferences, and multi-dimensional user activity characteristics associated with an account of the user.

The user may play and watch the media content without having to interact with a remote control to select and advance the playing of the media content items. In some implementations, the user may interact with a remote control for a network-connected display device such as a smart television when selecting and watching media content items. In some implementations, a media adapter may provide media content to a network-connected display device. In some implementations, a mobile computing device of the user may implement a virtual remote control for interacting with the media adapter. In these implementations, the user may interact with the remote control device and/or the virtual remote control when selecting and viewing media content on the network-connected display device.

A user may autoplay a variety of types of media content provided by different media content providers on a network-connected display device. In some implementations, the network-connected display device may be a smart television that executes a television (TV) application. The TV application may interface with the media content providers to continuously stream recommended media content items to the television for autoplaying to the user. In some implementations, a media adapter may interface with a server-side TV application. The server-side TV application may interface with the media content providers to provide recommended media content items to the media adapter for continuously streaming on the network-connected display device for autoplaying to the user.

The TV application may be presented with the at least one technical problem of autoplaying recommended media content items provided by multiple different media content providers. For example, different media content provider applications may provide the media content items for autoplaying. As at least one technical solution to the at least one technical problem, the TV application may switch between media content provider applications when providing the media content items for autoplaying. The TV application may switch between the media content provider applications without user intervention. The at least one technical effect may be the ability of the TV application to autoplay recommended media content items from different media content providers on a television without user interactions or interventions with the TV application.

Figure 1B:
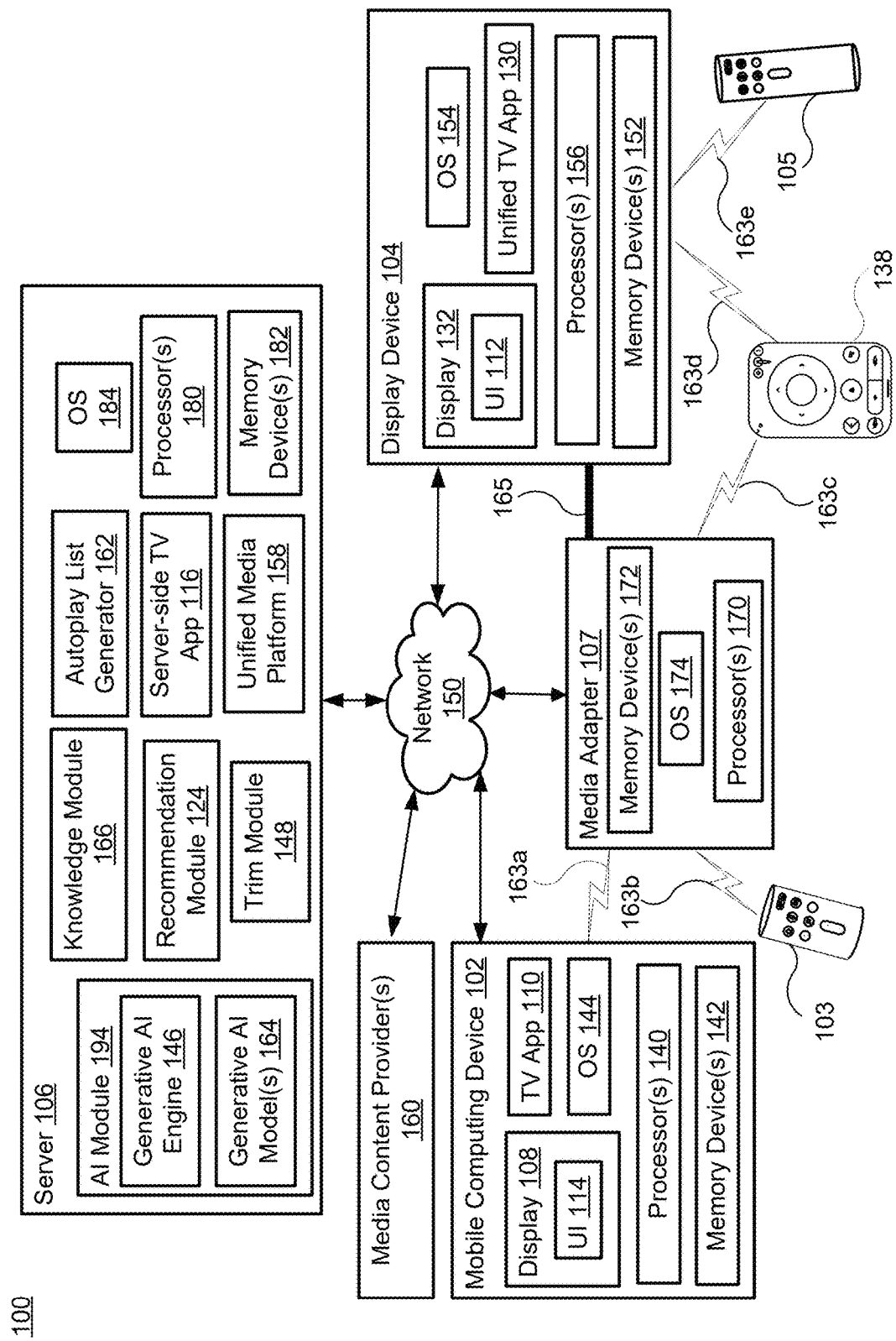
FIG. 1B illustrates an example system for autoplaying media content provided by different media content providers on a network-connected display device, according to implementations described throughout this disclosure.

FIG. 1A illustrates an example of a user 101 interacting with a network-connected display device 104 and a media adapter 107, according to implementations described throughout this disclosure. FIG. 1B illustrates an example system 100 for generating an autoplay list of media content items from different media content providers for autoplaying by a unified television application 130 executing on the network-connected display device 104, according to implementations described throughout this disclosure.

The network-connected display device 104 may communicate with a server computer 106 and media content providers 160 by way of a network 150. The media content providers 160, the network-connected display device 104, the server computer 106, and a mobile computing device 102 may interact with and communicate with one other by way of the network 150. In some implementations, the mobile computing device 102 may interface or connect to the media adapter 107 and/or the network-connected display device 104 by way of a wireless communication link that may be a short-range wireless connection such as, for example a Bluetooth connection or a Wi-Fi (e.g., direct Wi-Fi) connection.

In some implementations, the user 101 may connect to and interact with the media adapter 107 by way of the network-connected display device 104 using a server-side television (TV) application 116 installed on the server computer 106. The media adapter 107 may be connected or interfaced to the network-connected display device 104. The network-connected display device 104 may be communicatively coupled or connected to the server computer 106 by way of the network 150. In these implementations, a unified media platform (UMP) 158 may provide or serve media content items from the media content providers 160 to the network-connected display device 104 by way of the media adapter 107.

In some implementations, the user 101 may interact with the network-connected display device 104 using a remote control device 105. In some implementations, a television (TV) application 110 may render a virtual remote control 138 in a user interface (e.g., the UI 114) on a display (e.g., the mobile computing device display 108) on the mobile computing device 102. The virtual remote control 138 may allow the mobile computing device 102 to act as a remote control for the network-connected display device 104. The TV application 110 may render the virtual remote control 138 for use with the network-connected display device 104. The user may interact with the remote control device 105 and/or the virtual remote control 138 when selecting media content for viewing on the network-connected display device 104.

In some implementations, the user 101 may connect to and interact with the media adapter 107 using the television (TV) application 110 installed on the mobile computing device 102. In some implementations, the user 101 may connect to and interact with the media adapter 107 using a media adapter remote control device 103. In some implementations, the TV application 110 may render the virtual remote control 138 for use with the media adapter 107. The virtual remote control 138 may allow the mobile computing device 102 to act as a remote control for the media adapter 107. The user 101 may interact with the virtual remote control 138 and/or the media adapter remote control device 103 when interacting with the media adapter 107.

The network-connected display device 104 may execute the unified television application 130. The unified television application 130 may interface with a server-side television (TV) application 116. The unified television application 130 may present an autoplay option 109 in a user interface (UI) 112 on a display 132 included in the network-connected display device 104. For example, the user 101 may interact with the remote control device 105 to click on or select the autoplay option 109. Once selected, the unified television application 130 executing on the network-connected display device 104 may request an autoplay list for the user 101 from an autoplay list generator 162 on the server computer 106. The network-connected display device 104 may receive the autoplay list from the server computer 106. The unified television application 130 may request the media content item associated with the entries in the autoplay list from the UMP 158. The UMP 158 may interface with the media content providers 160 to obtain and serve the media content item to the unified television application 130 executing on the network-connected display device 104. The unified television application 130 may present or play the media content item on the display 132.

The UMP 158 may interface with the unified television application 130 executing on the network-connected display device 104 and the media content providers 160 to sequentially provide the media content items associated with the entries in the autoplay list in the order of the entries in the autoplay list to the network-connected display device 104 without any input or intervention from the user 101. In addition, or in the alternative, the unified television application 130 may provide the media content items associated with the entries in the autoplay list to the network-connected display device 104 without any interruption or break between the playing of the media content items.

The server computer 106 may include a knowledge module 166. The knowledge module 166 may include information associated with media content items provided by the media content providers 160. In some implementations, the knowledge module 166 may generate media content recommendations for associating with an account of a user based, in part, on a multi-dimensional user activity characteristic associated with the account of the user and the information associated with media content items provided by the media content providers 160. The user activity characteristic associated with the account of the user may be obtained from a plurality of information sources that may include, but are not limited to, a search engine, a mapping application, and an online retailer. The information sources may provide activity data related to activities of the account of the user by way of a respective software program or application.

The knowledge module 166 may help the autoplay list generator 162 determine media content that may be useful and of interest to the user. In some implementations, the unified television application 130 may interface with the knowledge module 166 to provide information and data related to the past activities of the user when interacting with the unified television application 130, the viewing history of the user, and/or the popularity of media content items of a type, classification, category, group or genre.

The mobile computing device 102 may be configured to execute the TV application 110. The mobile computing device 102 may include the mobile computing device display 108 configured to display the UI 114. A user may interact with the UI 114 to set up, control, and interact with the TV application 110. In some implementations, as described, the TV application 110 may display the virtual remote control 138 in the UI 114 allowing the user 101 to interact with and control the network-connected display device 104 and/or the media adapter 107.

The mobile computing device 102 may be any type of computing device that includes one or more processors (processor(s) 140), one or more memory devices (memory device(s) 142), and an operating system 144. The mobile computing device 102 may be a smartphone, a tablet, a wearable device, a laptop computer, or a desktop computer. In some implementations, the operating system 144 may be system software that manages computer hardware, software resources, and provides common services for computing programs.

In some implementations, the mobile computing device 102 may be a tablet, a smartphone, or a wearable. In these implementations, the operating system 144 may be referred to as a mobile operating system. The mobile operating system may be configured to execute on devices that, in general, include display devices that may be smaller in size than, for example, a display device included in a laptop computer or a desktop computer. In some implementations, the mobile computing device 102 may be a laptop computer. In these implementations, the operating system may be referred to as a laptop or desktop operating system. In these implementations, the operating system 144 may be an operating system designed for a display that is larger in size than that included in a tablet, a smartphone, or a wearable.

In some implementations, the media adapter 107 (e.g., a casting device, a media streaming device, a media streaming player, a set-top box) may be interfaced with or connected to the network-connected display device 104. The media adapter 107 may interact with and communicate with the media content providers 160, the server computer 106, and the mobile computing device 102 when providing media content to the network-connected display device 104. In some implementations, the media adapter 107 may be embedded in and/or an integrated part of the network-connected display device 104.

The media content providers 160 may include a variety of streaming service and media content sources and service platforms. The media adapter 107 may facilitate providing (e.g., streaming) media content (e.g., streaming video such as movies, TV shows, etc.) from one or more streaming services included in the media content providers 160 to the network-connected display device 104. For example, the media adapter 107 may directly connect to a connector on the network-connected display device 104 by way of connection 165. The media adapter 107 may provide digital video and/or audio to the network-connected display device 104. For example, the media adapter 107 may connect to a high-definition multimedia interface (HDMI) connector included in the network-connected display device 104. Examples of the media adapter 107 may include, but are not limited to, a set-top box, a television box, and a streaming media adapter.

In some implementations, the mobile computing device 102 may connect to or interface with the media adapter 107 by way of a wireless communication link 163b. Wireless communication links 163a-e may be short-range wireless connections such as a Bluetooth connection. In some examples, wireless communication links 163a-e may be a Wi-Fi (e.g., direct Wi-Fi) connection.

The media adapter 107 may be any type of computing device that includes one or more processors (processor(s) 170), one or more memory devices (memory device(s) 172), and an operating system 174. In some implementations, the processor(s) 170 may include a system on a chip (SoC). The SoC may include a central processing unit (CPU), a graphic processing unit (GPU), one or more memory interfaces, and one or more input/output interfaces and devices. In some implementations, the operating system 174 may be system software that manages computer hardware, software resources, and provides common services for computing programs.

The network-connected display device 104 may include the unified television application 130. The unified television application 130 may keep a record of the interactions of the user with the media content received from the server computer 106. The network-connected display device 104 may send the record of the interactions to the server computer 106 for use in determining media content recommendations for the user.

In some implementations, the network-connected display device 104 may be configured to execute the unified television application 130. For example, the network-connected display device 104 may be a smart television. For example, a smart television may be a network-connected television that may connect to media content providers (e.g., media content providers 160) by way of a network (e.g., the network 150). The media content providers may source media content to the smart television. In these implementations, a user may interact with the unified television application 130 to access media content from the media content providers 160. The unified television application 130 may interface with the server computer 106, and specifically with the server-side TV application 116. The unified television application 130 may provide similar functionality to the user as that provided by an application executing on the media adapter 107. For example, executing the unified television application 130 by the network-connected display device 104 allows the network-connected display device 104 to obtain a media content recommendation stream from the server computer 106.

The network-connected display device 104 may be configured to connect to the network 150. In some implementations, the network-connected display device 104 is a television (e.g., a smart television (TV)). The network-connected display device 104 may include one or more processors (processor(s) 156), one or more memory devices (memory device(s) 152), and an operating system (OS) 154. The operating system 154 may execute (or assist with executing) the unified television application 130.

In some implementations, the operating system 154 may be a browser application. A browser application is a web browser configured to access information on the Internet by way of a network (e.g., the network 150). A browser application may launch one or more browser tabs in the context of one or more browser windows in the browser application. In some implementations, the operating system 154 is a Linux-based operating system configured to execute (or assist with executing) the unified television application 130.

The system 100 may include one or more server computers (e.g., the server computer 106) configured to interface with the mobile computing device 102, the media adapter 107, the media content providers 160, and the network-connected display device 104 by way of the network 150. In some implementations, the network 150 may establish a wireless communication link between the network-connected display device 104, the mobile computing device 102, the media adapter 107, the media content providers 160, and the server computer 106.

The server computer 106 may include the unified media platform (UMP) 158. The UMP 158 may facilitate the providing of the media content items for autoplaying on the network-connected display device 104. The UMP 158 may manage the providing of the media content items associated with entries in the autoplay list to the network-connected display device 104. In some implementations, the UMP 158 may manage the providing of the media content items from the media content providers 160 to the mobile computing device 102. The UMP 158 may facilitate the providing of the media content items with entries in the autoplay list to the network-connected display device 104 such that the network-connected display device 104 may autoplay the media content items on the network-connected display device 104. The network-connected display device 104 may autoplay the media content items without user input or user intervention. In addition, or in the alternative, the network-connected display device 104 may autoplay the media content items in a continuous uninterrupted manner.

The UMP 158 may facilitate the providing of media content items to the network-connected display device 104 as described herein. In some implementations, the UMP 158 may facilitate the providing of the media content item for a respective entry in the autoplay list to the media adapter 107. The media adapter 107 may stream the media content item from the media content providers 160 to the network-connected display device 104. In response to receiving an indication of a selection of the autoplay option 109, the server-side television application 116 may enable the sequential, uninterrupted display of the media content items associated with respective entries in the autoplay list on the display 132. In some implementations, the UMP 158 may function as a centralized media content management module configured to facilitate providing media content items to the mobile computing device 102.

The server computer 106 may include the server-side TV application 116. The server-side TV application 116 may facilitate providing the media content items associated with the entries in the autoplay list to the unified television application 130 for playing on the network-connected display device 104. The server-side TV application 116 may facilitate providing the media content items associated with the entries in the autoplay list to the unified television application 130 in response to receiving an indication from the unified television application 130 that a user selected the autoplay option 109

The server computer 106 may include a recommendation module 124. The recommendation module 124 may interface with the knowledge module 166 and an artificial intelligence (AI) module 194 to determine media content items that may be recommended for autoplaying. The recommendation module 124 may provide the recommended media content items to the autoplay list generator 162 for inclusion in an autoplay list. In some implementations, the recommendation module 124 may provide a score or other type of indication that relates to an affinity of the user for the recommended media content item. The autoplay list generator 162 may sort the received recommended media content items based on the affinity of the user for the media content item, ranking the recommended media content items based on an associated score. The ranking may include the recommended media content items with a higher score or greater affinity of the user higher in the autoplay list.

The server computer 106 may include a trim module 148. The trim module 148 may interface with the media content providers 160, the UMP 158, and the AI module 194. In some implementations, the autoplay list generator 162 may specify a total runtime for a media content item included in the autoplay list. In some implementations, a media content item may have a runtime longer than the total runtime specified by the autoplay list generator 162. The trim module 148 may parse the media content item to determine one or more clips that satisfy the specified runtime for a media content item in the autoplay list. The trim module 148 may provide the information about a clip to the autoplay list generator 162. The autoplay list generator 162 may substitute the information about the clip for the media content item in place of the entry for the media content item in the autoplay list. For example, the unified television application 130 may autoplay the clip for the media content item when autoplaying the media content items in the autoplay list.

In some implementations, the trim module 148 may provide the information about more than one clip (e.g., two or more clips) to the autoplay list generator 162. The autoplay list generator 162 may substitute the information about the two or more clips for the media content item in place of the entry for the media content item in the autoplay list. For example, the unified television application 130 may autoplay the two or more clips for the media content item when autoplaying the media content items in the autoplay list.

The server computer 106 may include the artificial intelligence (AI) module 194. The AI module 194 may receive information and data from the mobile computing device 102 and/or the network-connected display device 104 to build generative artificial intelligence (AI) model(s) 164 for use by the AI module 194. In some implementations, the AI module 194 may provide the recommendation module 124 with a plurality of recommended media content items for use by the autoplay list generator 162. The autoplay list generator 162 may include an entry for the recommended media content items in the autoplay list. The autoplay list generator 162 may provide the autoplay list to the server-side TV application 116. The server-side TV application 116 may interface with the UMP 158 to provide the media content items associated with the entries in the autoplay list to the unified television application 130.

The AI module 194 may receive updated media content recommendations from the knowledge module 166 along with updated information and data from the mobile computing device 102 and/or the network-connected display device 104 to retrain the generative AI model(s) 164. The AI module 194 may use the retrained generative AI model(s) 164 to provide the autoplay list generator 162 with updated recommended media content items for inclusion in an autoplay list. The autoplay list generator 162 may generate an updated autoplay list for use by the server-side TV application 116.

In some implementations, the generative AI engine 146 may use generative artificial intelligence along with the generative AI model(s) 164 for determining a start time and end time for a clip. For example, the generative AI model(s) 164 may determine one or more clips for a media content item that may be considered famous, liked, and/or enjoyed by users. In some implementations, the AI module 194 may be referred to as a generative artificial intelligence (generative AI) back end. For example, as described, generative AI may determine one or more clips in a media content item. The generative AI may curate or create a collection of clips for a media content item.

The use of generative AI can help further focus and refine the clips generated for a media content item. For example, the generative AI engine 146 may update and refine the generative AI model(s) as more knowledge is gained about the clips by receiving responses and feedback from users who view the clips.

The mobile computing device 102 may include the mobile computing device display 108. In some implementations, the mobile computing device display 108 is a display device such as a liquid crystal display (LCD), a light-emitting diode (LED) display, an organic light-emitting diode (OLED) display, or an active-matrix organic light-emitting diode (AMOLED) display. The network-connected display device 104 may include the display 132. In some implementations, the display 132 is a display device such as a liquid crystal display (LCD), a light-emitting diode display (LED) display, a plasma display, a quantum dot light-emitting diode display (QLED) display, or an organic light-emitting diode (OLED) display.

The processor(s) 156, the processor(s) 140, the processor(s) 170, and the processor(s) 180 may be formed in a substrate configured to execute one or more machine executable instructions or pieces of software, firmware, or a combination thereof. The processor(s) 156, the processor(s) 140, the processor(s) 170, and the processor(s) 180 may be semiconductor-based. For example, the processor(s) 156, the processor(s) 140, the processor(s) 170, and the processor(s) 180 may include semiconductor material that can perform digital logic.

The memory device(s) 152, the memory device(s) 142, the memory device(s) 172, and the memory device(s) 182 may include main memory that stores information in a format that can be read and/or executed by the processor(s) 156, the processor(s) 140, the processor(s) 170, and the processor(s) 180 respectively. The memory device(s) 152, the memory device(s) 142, the memory device(s) 172, and the memory device(s) 182 may include one or more random-access memory (RAM) devices and/or one or more read-only memory (ROM) devices.

The memory device(s) 152, memory device(s) 142, the memory device(s) 172, and the memory device(s) 182 may store applications that, when executed by the processor(s) 156, the processor(s) 140, the processor(s) 170, and the processor(s) 180, respectively, perform operations. For example, the memory device(s) 142 may store the operating system 144 and the TV application 110 that, when executed by the processor(s) 140, may perform operations on the mobile computing device 102. For example, the memory device(s) 152 may store the operating system 154 and the unified television application 130 that, when executed by the processor(s) 156, may perform operations on the network-connected display device 104.

In some implementations, the memory device(s) 182 may represent any kind of (or multiple kinds of) memory (e.g., RAM, flash, cache, disk, tape, etc.). In some implementations, the memory device(s) 182 may include external storage, e.g., memory physically remote from but accessible by the server computer 106. The server computer 106 may include one or more modules, engines, or applications representing specially programmed software. In some implementations, the server computer 106 may include the operating system 184, the server-side TV application 116, the knowledge module 166, the AI module 194, the generative AI engine 146, the generative AI model(s) 164, the UMP 158, the autoplay list generator 162, the trim module 148, the recommendation module 124, processor(s) 180, and the device(s) 182. For example, the memory device(s) 182 may store the operating system 184, the server-side TV application 116, the knowledge module 166, the AI module 194, the generative AI engine 146, the generative AI model(s) 164, the UMP 158, the autoplay list generator 162, the trim module 148, the recommendation module 124 that, when executed by the processor(s) 180, may perform operations on server computer 106 to implement one or more of the methods and processes described herein.

The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within the network 150. The network 150 may further include any number of hardwired and/or wireless connections. The network 150 may be, for example, communications networks having one or more types of topologies, including but not limited to the Internet, intranets, local area networks (LANs), cellular networks, Ethernet, Storage Area Networks (SANs), telephone networks, and Bluetooth personal area networks (PAN). In some implementations, two or more devices in a sub-network may be coupled by way of a wired connection, while at least some of the devices in the same sub-network are coupled by way of a local radio communication network (e.g., ZigBee, Z-Wave. Insteon, Bluetooth, Wi-Fi and other radio communication networks).

Figure 2:
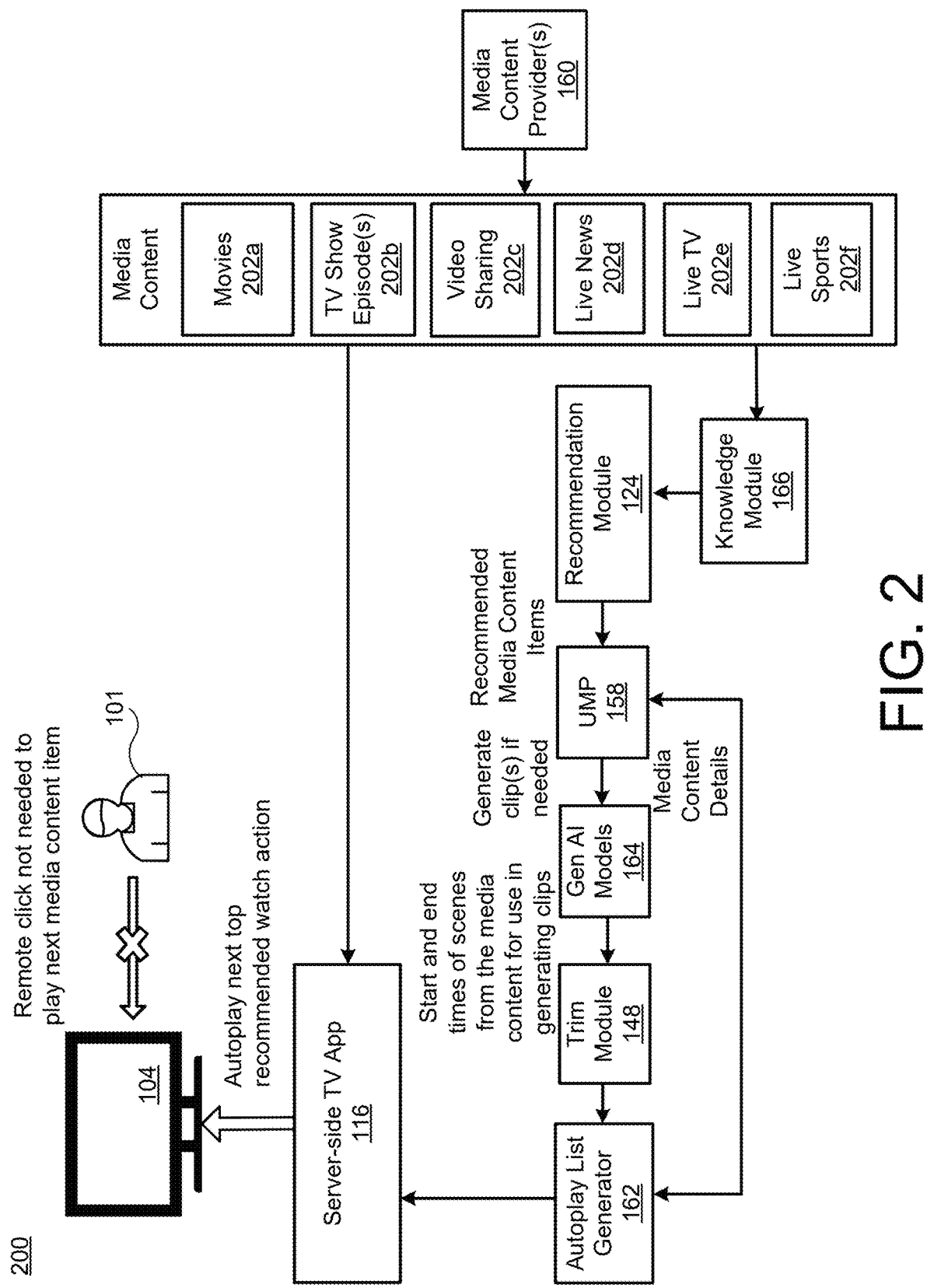
FIG. 2 illustrates an example flow diagram of a process for autoplaying different types of media content from different media content providers, according to implementations described throughout this disclosure.

FIG. 2 illustrates an example flow diagram of a process 200 for autoplaying different types of media content 202*a-f* from different media content providers 160, according to implementations described throughout this disclosure. Referring with reference to FIGS. 1A and 1B, the unified television application 130 may provide a user interface 118 for display in the UI 112 on the display 132. The user 101 may select or click on the autoplay option 109 that may begin autoplaying recommended media content items included in an autoplay list on the network-connected display device 104. In response to receiving an indication of the selection of the selection of the autoplay option 109, the unified television application 130 may create a request for an autoplay list for the user 101. The network-connected display device 104 may send the request for the autoplay list to the server computer 106. The server-side TV application 116 may receive the request for the autoplay list and may interface with the autoplay list generator 162 that may create or generate the autoplay list for sending by the server computer 106 to the network-connected display device 104 for use by the unified television application 130 when serving the watch list of media content items included in the autoplay list to the display 132 for viewing by the user 101 without user intervention or input.

The media content providers may provide a variety of different types of media content that may be of interest to a user. For example, the media content providers 160 may provide media content that may include but is not limited to movies 202a, television show episode(s) 202b, video sharing content 202c, live news content 202d, live television content 202e, and live sports content 202f.

The knowledge module 166 may receive information and data related to the media content 202a-f. The information and data may be metadata associated with a media content item. The metadata may include but is not limited to a runtime for the media content item, actors, titles, descriptions, content providers, genres, etc. The recommendation module 124 may receive media content recommendations associated with an account of a user from the knowledge module 166. The recommendation module 124 may determine the media content items to recommend based, in part, on a multi-dimensional user activity characteristic associated with the account of the user and the information and data associated with media content items provided by the media content providers 160. The user activity characteristic associated with the account of the user may be obtained from a plurality of information sources that may include, but are not limited to, a search engine, a mapping application, and an online retailer. The information sources may provide activity data related to activities of the account of the user by way of a respective software program or application.

The recommendation module 124 may provide a list of recommended media content items for viewing by the user 101 to the UMP 158. The recommendation module 124 may provide the metadata associated with a media content item to the recommendation module 124. In some implementations, the recommendation module 124 may generate an ordered and ranked list of the recommended media content items with the more highly recommended media content items at the top of the list. The UMP 158 may manage the providing of the media content items associated with the media content recommendations to the network-connected display device 104.

The recommendation module 124 may provide the metadata associated with each respective media content item included in the list of the recommended media content items to the UMP 158. In some implementations, the UMP 158 may receive a runtime for a media content item for inclusion in an autoplay list from the autoplay list generator 162. For example, the autoplay list generator 162 may determine a preferred runtime for media content items for autoplaying to a user. The preferred runtime may be based on user feedback related to viewing times for individual media content items autoplayed to a user. In some implementations, the preferred runtime may be the same for all types of media content, such as shared videos, movies, etc. In some implementations, the preferred runtime may vary depending on the type of media content. For example, a user may prefer a runtime for autoplaying shared video content items that is less than a preferred runtime for autoplaying a movie, which typically may have a longer total runtime as compared to a total runtime for a shared video. In some implementations, the preferred runtime for autoplaying movie content may be less than the total runtime for the movie.

In some implementations, the UMP 158 may provide a recommended media content item to the generative AI model(s) 164. In cases where the runtime of the recommended media content item exceeds a preferred runtime for the type of media content item, the generative AI model(s) 164 may determine one or more scenes included in the media content item that may be of interest to the user. The generative AI model(s) 164 may determine a start time and an end time in the media content item that defines a scene in the media content item. The trim module 148 may use the start time and the end time for the scene to generate a clip for the media content item. The clip may define a modified watch action for the media content item that includes the start time and the end time for the scene. The clip may be substituted for the media content item in the autoplay list generated by the autoplay list generator 162. In some implementations, the generative AI model(s) 164 may determine a start time and an end time for a plurality of scenes in the media content item. The trim module 148 may use the start time and the end time for each scene to generate respective clips for the plurality of scenes in the media content item. A clip may define a modified watch action for the media content item that includes the start time and the end time for the respective scene. In these implementations, the clips (e.g., two or more clips) may be substituted for the media content item in the autoplay list generated by the autoplay list generator 162.

The autoplay list generator 162 may provide the autoplay list to the server-side TV application 116. The server-side TV application 116 may interface with the media content providers 160 to serve, send, or provide the different types of media content 202a-f from the different media content providers 160 included in the autoplay list to the network-connected display device 104 for autoplaying to the user 101.

Figure 3:
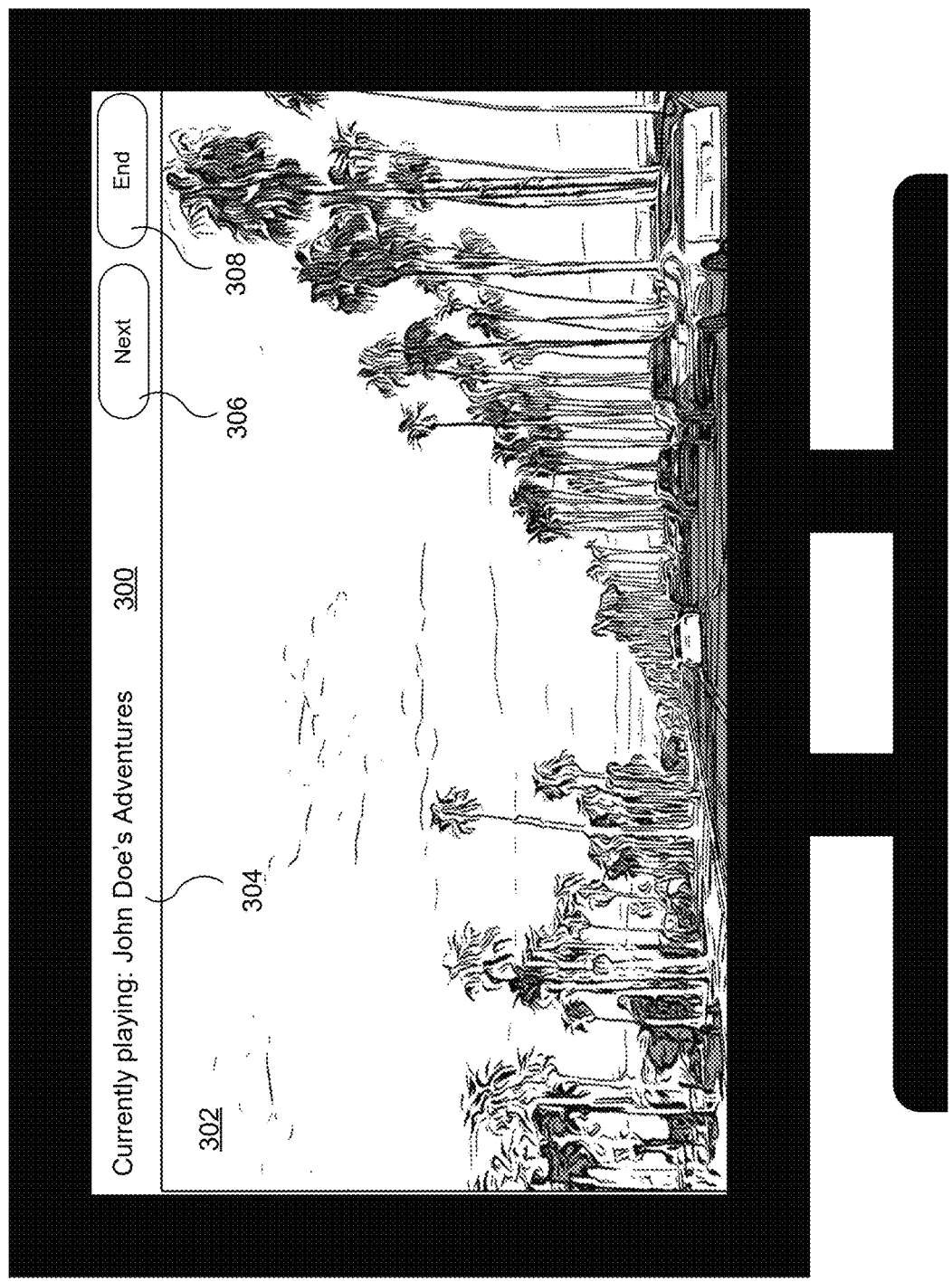
FIG. 3 illustrates an example user interface for a television application autoplaying media content on a television according to implementations described throughout this disclosure.

FIG. 3 illustrates an example user interface 300 for a television application (e.g., the unified television application 130) autoplaying media content on a television (e.g., the network-connected display device 104) according to implementations described throughout this disclosure. The user interface 300 includes a watch area 302 for autoplaying the media content item. The user interface 300 may include an identification area 304 that may include metadata associated with the media content item playing in the watch area 302 such as a title.

The user interface 300 may include a next button 306. For example, a user may want to skip the playing of the current media content item in the watch area 302 to advance to the playing of the next media content item in the watch area 302. The user may select or click on the next button 306 to end the playing of the current media content item in the watch area 302 and advance to playing the media content item that is next in the autoplay list in the watch area 302.

The user interface 300 may include an end button 308. For example, the user may want to stop or end the autoplaying of media content. The user may select or click on the end button 308 to stop autoplaying media content in the watch area 302.

Figure 4:
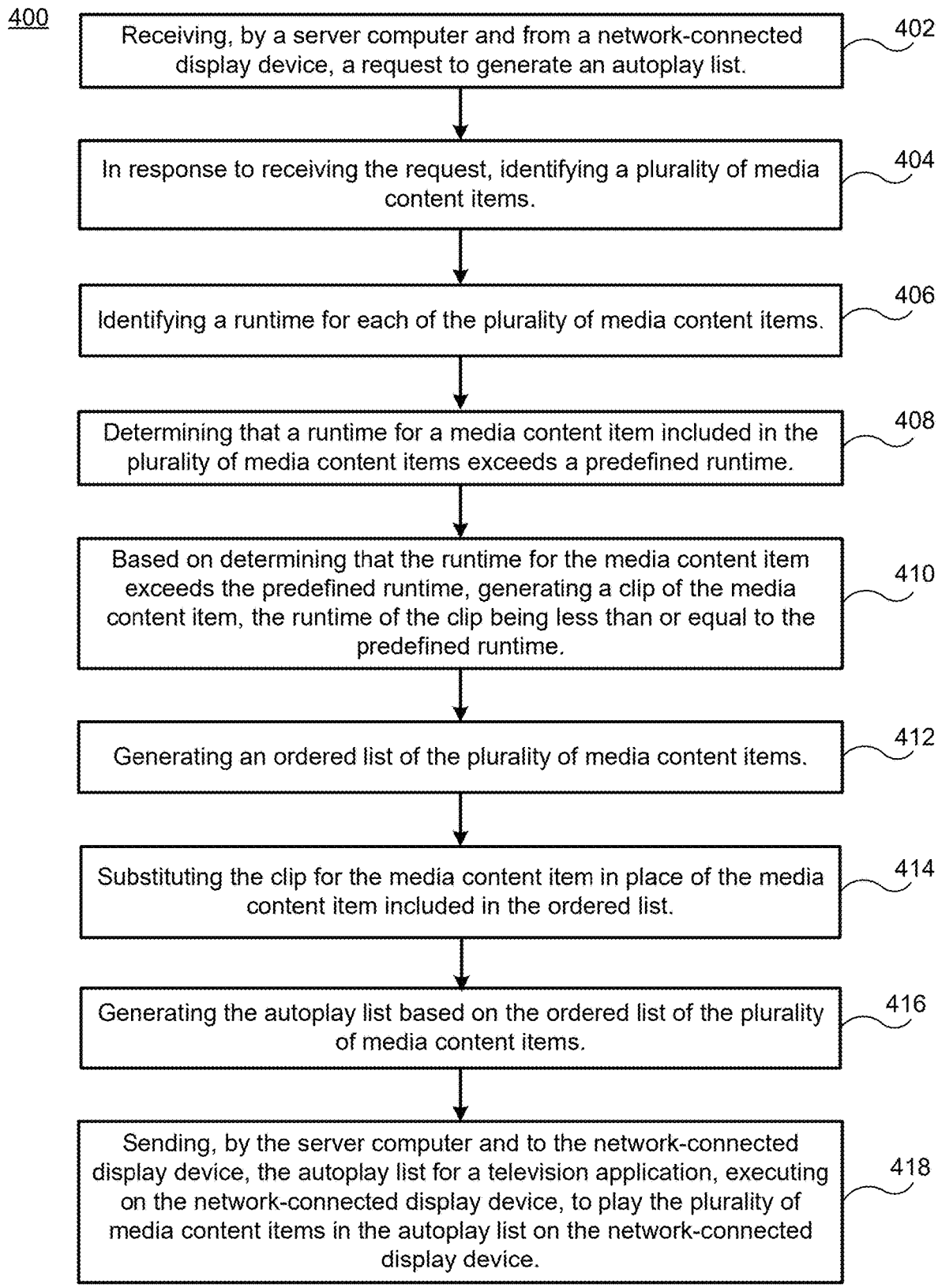
FIG. 4 illustrates a flowchart depicting example operations of generating an autoplay list for autoplaying media content on a television according to implementations described throughout this disclosure.

FIG. 4 illustrates a flowchart depicting example operations of generating an autoplay list for autoplaying media content on a television according to implementations described throughout this disclosure. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion. The operations may define a computer-implemented method. Although the flowchart 400 is described with reference to the system 100 of FIG. 1B, the flowchart 400 may be executed according to any of the figures discussed herein. In some examples, the operations of the flowchart 400 are executed by server computer 106.

Operation 402 includes receiving, by a server computer and from a network-connected display device, a request to generate an autoplay list. For example, a user may select or click on the autoplay option 109. In response to the selection of the autoplay option 109, the unified television application 130 may generate a request for the generation of an autoplay list that the network-connected display device 104 may send or transmit to the server computer 106.

Operation 404 includes, in response to receiving the request, identifying a plurality of media content items. For example, the server-side TV application 116 may interface with the recommendation module 124. The recommendation module 124 may identify the plurality of media content items as described herein.

Operation 406 includes identifying a runtime for each of the plurality of media content items. For example, the UMP 158 may identify a runtime for each of the plurality of media content items.

Operation 408 includes determining that a runtime for a media content item included in the plurality of media content items exceeds a predefined runtime. For example, the UMP 158 may determine that a runtime for a media content item included in the plurality of media content items exceeds a predefined runtime.

Operation 410 includes, based on determining that the runtime for the media content item exceeds the predefined runtime, generating a clip of the media content item, the runtime of the clip being less than or equal to the predefined runtime. For example, the generative AI model(s) 164 may determine one or more scenes included in the media content item that may be of interest to the user. The trim module 148 may use the start time and the end time for the scene to generate a clip for the media content item.

Operation 412 includes generating an ordered list of the plurality of media content items. For example, the recommendation module 124 may generate an ordered list of the plurality of media content items.

Operation 414 includes substituting the clip for the media content item in place of the media content item included in the ordered list. For example, the clip may define a modified watch action for the media content item that includes the start time and the end time for the scene. The clip may be substituted for the media content item in the autoplay list generated by the autoplay list generator 162.

Operation 416 includes generating the autoplay list based on the ordered list of the plurality of media content items. For example, the autoplay list generator 162 may generate the autoplay list based on the ordered list of the plurality of media content items Operation 418 includes sending, by the server computer and to the network-connected display device, the autoplay list for a television application, executing on the network-connected display device, to play the plurality of media content items in the autoplay list on the network-connected display device. For example, the server computer 106 may send the autoplay list to the network-connected display device 104. The unified television application 130 may receive the autoplay list and begin playing the media content items in the autoplay list on the display 132.

In some examples, the techniques described herein relate to a method including: receiving, by a server computer and from a network-connected display device, a request to generate an autoplay list; and in response to receiving the request: identifying a plurality of media content items; identifying a runtime for each of the plurality of media content items; determining that a runtime for a media content item included in the plurality of media content items exceeds a predefined runtime; based on determining that the runtime for the media content item exceeds the predefined runtime, generating a clip of the media content item, the runtime of the clip being less than or equal to the predefined runtime; generating an ordered list of the plurality of media content items; substituting the clip for the media content item in place of the media content item included in the ordered list; generating the autoplay list based on the ordered list of the plurality of media content items; and sending, by the server computer and to the network-connected display device, the autoplay list for a television application, executing on the network-connected display device, to play the plurality of media content items in the autoplay list on the network-connected display device.

In some examples, the techniques described herein relate to a method, wherein the network-connected display device is a smart television.

In some examples, the techniques described herein relate to a method, wherein generating the clip of the media content item includes creating a modified watch action for the media content item that includes a start time and an end time for the clip.

In some examples, the techniques described herein relate to a method, wherein substituting the clip for the media content item in place of the media content item includes serving the modified watch action in place of the media content item.

In some examples, the techniques described herein relate to a method, wherein generating the clip of the media content item includes generating a first clip including: identifying a start time and an end time for a first scene included in the media content item; and creating a first modified watch action for the media content item that includes the start time and the end time for the first scene.

In some examples, the techniques described herein relate to a method, wherein generating the clip of the media content item further includes generating a second clip including: identifying a start time and an end time for a second scene included in the media content item; and creating a second modified watch action for the media content item that includes the start time and the end time for the second scene.

In some examples, the techniques described herein relate to a method, wherein substituting the clip for the media content item in place of the media content item includes substituting the first clip for the media content item and the second clip for the media content item in place of the media content item by serving the first modified watch action and the second modified watch action in place of the media content item.

In some examples, the techniques described herein relate to a method, wherein identifying a plurality of media content items includes identifying a plurality of media content providers that provide media content to a user of the television application.

In some examples, the techniques described herein relate to a method, wherein identifying a plurality of media content items includes determining preferences of a user for types of media content.

In some examples, the techniques described herein relate to a method, wherein creating an ordered list of the plurality of media content items includes ordering the plurality of media content items in the ordered list based on the preferences of the user.

In some examples, the techniques described herein relate to a non-transitory computer-readable medium storing executable instructions that when executed by at least one processor of a server computer cause the at least one processor to execute operations, the operations including: receiving, by the server computer and from a network-connected display device, a request to generate an autoplay list; and in response to receiving the request: identifying a plurality of media content items; identifying a runtime for each of the plurality of media content items; determining that a runtime for a media content item included in the plurality of media content items exceeds a predefined runtime; based on determining that the runtime for the media content item exceeds the predefined runtime, generating a clip of the media content item, the runtime of the clip being less than or equal to the predefined runtime; generating an ordered list of the plurality of media content items; substituting the clip for the media content item in place of the media content item included in the ordered list; generating the autoplay list based on the ordered list of the plurality of media content items; and sending, by the server computer and to the network-connected display device, the autoplay list for a television application, executing on the network-connected display device, to play the plurality of media content items in the autoplay list on the network-connected display device.

In some examples, the techniques described herein relate to a non-transitory computer-readable medium, wherein the network-connected display device is a smart television.

In some examples, the techniques described herein relate to a non-transitory computer-readable medium, wherein generating the clip of the media content item includes creating a modified watch action for the media content item that includes a start time and an end time for the clip.

In some examples, the techniques described herein relate to a non-transitory computer-readable medium, wherein substituting the clip for the media content item in place of the media content item includes serving the modified watch action in place of the media content item.

In some examples, the techniques described herein relate to a non-transitory computer-readable medium, wherein generating the clip of the media content item includes generating a first clip including: identifying a start time and an end time for a first scene included in the media content item; and creating a first modified watch action for the media content item that includes the start time and the end time for the first scene.

In some examples, the techniques described herein relate to a non-transitory computer-readable medium, wherein generating the clip of the media content item further includes generating a second clip including: identifying a start time and an end time for a second scene included in the media content item; and creating a second modified watch action for the media content item that includes the start time and the end time for the second scene.

In some examples, the techniques described herein relate to a non-transitory computer-readable medium, wherein substituting the clip for the media content item in place of the media content item includes substituting the first clip for the media content item and the second clip for the media content item in place of the media content item by serving the first modified watch action and the second modified watch action in place of the media content item.

In some examples, the techniques described herein relate to a system including: at least one processor; and a non-transitory computer-readable medium storing instructions that when executed by the at least one processor cause the system to: receive a request to generate an autoplay list; and in response to receiving the request: identify a plurality of media content items; identify a runtime for each of the plurality of media content items; determine that a runtime for a media content item included in the plurality of media content items exceeds a predefined runtime; based on determining that the runtime for the media content item exceeds the predefined runtime, generate a clip of the media content item, the runtime of the clip being less than or equal to the predefined runtime; generate an ordered list of the plurality of media content items; substitute the clip for the media content item in place of the media content item included in the ordered list; generate the autoplay list based on the ordered list of the plurality of media content items; and send, to a network-connected display device, the autoplay list for a television application, executing on the network-connected display device, to play the plurality of media content items in the autoplay list on the network-connected display device.

In some examples, the techniques described herein relate to a system, wherein the network-connected display device is a smart television.

In some examples, the techniques described herein relate to a system, wherein generating the clip of the media content item includes creating a modified watch action for the media content item that includes a start time and an end time for the clip; and wherein substituting the clip for the media content item in place of the media content item includes serving the modified watch action in place of the media content item.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Further to the descriptions above, a user may be provided with controls allowing the user to make an election as to both if and when systems, programs, or features described herein may enable collection of user information (e.g., a user's preferences, a user's current location, a user's credentials, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   receiving, by a server computer and from a network-connected display device, a request to generate an autoplay list; and
   in response to receiving the request:
      identifying a plurality of media content items;
      identifying a runtime for each of the plurality of media content items;
      determining that a runtime for a media content item included in the plurality of media content items exceeds a predefined runtime;
      based on determining that the runtime for the media content item exceeds the predefined runtime, generating a clip of the media content item, the runtime of the clip being less than or equal to the predefined runtime;
      generating an ordered list of the plurality of media content items;
      substituting the clip for the media content item in place of the media content item included in the ordered list;
      generating the autoplay list based on the ordered list of the plurality of media content items; and
      sending, by the server computer and to the network-connected display device, the autoplay list for a television application, executing on the network-connected display device, to play the plurality of media content items in the autoplay list on the network-connected display device.

2. The method of claim 1, wherein the network-connected display device is a smart television.

3. The method of claim 1, wherein generating the clip of the media content item comprises creating a modified watch action for the media content item that includes a start time and an end time for the clip.

4. The method of claim 3, wherein substituting the clip for the media content item in place of the media content item comprises serving the modified watch action in place of the media content item.

5. The method of claim 1, wherein generating the clip of the media content item comprises generating a first clip comprising:
   identifying a start time and an end time for a first scene included in the media content item; and
   creating a first modified watch action for the media content item that includes the start time and the end time for the first scene.

6. The method of claim 5, wherein generating the clip of the media content item further comprises generating a second clip comprising:
   identifying a start time and an end time for a second scene included in the media content item; and
   creating a second modified watch action for the media content item that includes the start time and the end time for the second scene.

7. The method of claim 6, wherein substituting the clip for the media content item in place of the media content item comprises substituting the first clip for the media content item and the second clip for the media content item in place of the media content item by serving the first modified watch action and the second modified watch action in place of the media content item.

8. The method of claim 1, wherein identifying a plurality of media content items comprises identifying a plurality of media content providers that provide media content to a user of the television application.

9. The method of claim 1, wherein identifying a plurality of media content items comprises determining preferences of a user for types of media content.

10. The method of claim 9, wherein creating an ordered list of the plurality of media content items comprises ordering the plurality of media content items in the ordered list based on the preferences of the user.

11. A non-transitory computer-readable medium storing executable instructions that when executed by at least one processor of a server computer cause the at least one processor to execute operations, the operations comprising:
receiving, by the server computer and from a network-connected display device, a request to generate an autoplay list; and
in response to receiving the request:
identifying a plurality of media content items;
identifying a runtime for each of the plurality of media content items;
determining that a runtime for a media content item included in the plurality of media content items exceeds a predefined runtime;
based on determining that the runtime for the media content item exceeds the predefined runtime, generating a clip of the media content item, the runtime of the clip being less than or equal to the predefined runtime;
generating an ordered list of the plurality of media content items;
substituting the clip for the media content item in place of the media content item included in the ordered list;
generating the autoplay list based on the ordered list of the plurality of media content items; and
sending, by the server computer and to the network-connected display device, the autoplay list for a television application, executing on the network-connected display device, to play the plurality of media content items in the autoplay list on the network-connected display device.

12. The non-transitory computer-readable medium of claim 11, wherein the network-connected display device is a smart television.

13. The non-transitory computer-readable medium of claim 11, wherein generating the clip of the media content item comprises creating a modified watch action for the media content item that includes a start time and an end time for the clip.

14. The non-transitory computer-readable medium of claim 13, wherein substituting the clip for the media content item in place of the media content item comprises serving the modified watch action in place of the media content item.

15. The non-transitory computer-readable medium of claim 11, wherein generating the clip of the media content item comprises generating a first clip comprising:
identifying a start time and an end time for a first scene included in the media content item; and
creating a first modified watch action for the media content item that includes the start time and the end time for the first scene.

16. The non-transitory computer-readable medium of claim 15, wherein generating the clip of the media content item further comprises generating a second clip comprising:
identifying a start time and an end time for a second scene included in the media content item; and
creating a second modified watch action for the media content item that includes the start time and the end time for the second scene.

17. The non-transitory computer-readable medium of claim 16, wherein substituting the clip for the media content item in place of the media content item comprises substituting the first clip for the media content item and the second clip for the media content item in place of the media content item by serving the first modified watch action and the second modified watch action in place of the media content item.

18. A system comprising:
at least one processor; and
a non-transitory computer-readable medium storing instructions that when executed by the at least one processor cause the system to:
receive a request to generate an autoplay list; and
in response to receiving the request:
identify a plurality of media content items;
identify a runtime for each of the plurality of media content items;
determine that a runtime for a media content item included in the plurality of media content items exceeds a predefined runtime;
based on determining that the runtime for the media content item exceeds the predefined runtime, generate a clip of the media content item, the runtime of the clip being less than or equal to the predefined runtime;
generate an ordered list of the plurality of media content items;
substitute the clip for the media content item in place of the media content item included in the ordered list;
generate the autoplay list based on the ordered list of the plurality of media content items; and
send, to a network-connected display device, the autoplay list for a television application, executing on the network-connected display device, to play the plurality of media content items in the autoplay list on the network-connected display device.

19. The system of claim 18, wherein the network-connected display device is a smart television.

20. The system of claim 18,
wherein generating the clip of the media content item comprises creating a modified watch action for the media content item that includes a start time and an end time for the clip; and
wherein substituting the clip for the media content item in place of the media content item comprises serving the modified watch action in place of the media content item.

* * * * *